United States Patent [19]

Bujard et al.

[11] Patent Number: 5,766,335
[45] Date of Patent: Jun. 16, 1998

[54] COLORED LUSTER PIGMENTS

[75] Inventors: Patrice Bujard, Grande-Fin; Natacha Bonnard, Le Paradis 43, both of Switzerland

[73] Assignee: Ciba Specialty Chemicals Corporation, Tarrytown, N.Y.

[21] Appl. No.: 842,295

[22] Filed: Apr. 23, 1997

[51] Int. Cl.⁶ ........................................ C09C 1/62
[52] U.S. Cl. .................. 106/404; 106/403; 106/415; 106/417; 106/418; 106/436; 106/438; 106/439; 106/440; 106/441; 106/442; 106/450; 106/451; 106/453; 106/454; 106/456; 106/457; 106/459; 106/472; 106/475; 106/479; 106/480; 106/481; 523/440

[58] Field of Search ..................... 106/403, 404, 106/415, 417, 418, 436, 438, 439, 440, 441, 442, 450, 451, 453, 454, 456, 457, 459, 472, 474, 475, 479, 480, 481; 523/440

[56] References Cited

U.S. PATENT DOCUMENTS

| | | | |
|---|---|---|---|
| 4,623,396 | 11/1986 | Kimura et al. | 106/417 |
| 4,867,794 | 9/1989 | Ambrosius et al. | 106/417 |
| 4,948,631 | 8/1990 | Ostertag et al. | 427/208 |
| 5,026,429 | 6/1991 | Mronga et al. | 106/400 |
| 5,135,812 | 8/1992 | Phillips et al. | 428/403 |
| 5,364,467 | 11/1994 | Schmid et al. | 106/404 |
| 5,401,306 | 3/1995 | Schmid et al. | 106/404 |
| 5,624,486 | 4/1997 | Schmid et al. | 106/404 |

FOREIGN PATENT DOCUMENTS

| | | |
|---|---|---|
| 0027718 | 4/1981 | European Pat. Off. |
| 0381047 | 8/1990 | European Pat. Off. |
| 0271767 | 12/1991 | European Pat. Off. |
| 0571836 | 12/1993 | European Pat. Off. |
| 0668329 | 8/1995 | European Pat. Off. |
| 3433657 | 3/1985 | Germany. |
| 3808070 | 9/1989 | Germany. |
| 9308237 | 4/1993 | WIPO. |
| 9403774 | 2/1994 | WIPO. |

OTHER PUBLICATIONS

Mochizuki et al., Jpn. J. Appl. Phys. 15 suppl. 41 (1976) (no month).
Abstract –97–214793 |20]of EP 768343 A2 (Apr. 1997).
Abstract –94–201478 |25]of DE 4341162 A1 (Jun. 1994).

*Primary Examiner*—Mark L. Bell
*Assistant Examiner*—Scott L. Hertzog
*Attorney, Agent, or Firm*—Kevin T. Mansfield

[57] ABSTRACT

The invention relates to colored luster pigments consisting of a transparent or metallic reflecting core, of a coating consisting of at least one silicon oxide of the composition $SiO_{0.25}$ to $SiO_{0.95}$ and of further optional coatings, to coating processes by coating metallic silicon in the presence of oxygen, if required with changing its partial pressure, as well as to the use of these luster pigments for pigmenting plastic materials, paints and printing inks, and to pigmented compositions comprising these luster pigments.

36 Claims, No Drawings

COLORED LUSTER PIGMENTS

The invention relates to coloured luster pigments consisting of a transparent or metallic reflecting core, of a coating consisting of at least one silicon oxide of the composition $SiO_{0.25}$ to $SiO_{0.95}$ and of further optional coatings, to coating processes by coating metallic silicon in the presence of oxygen, if required with changing its partial pressure, as well as to the use of these luster pigments for pigmenting plastic materials, paints and printing inks, and to pigmented compositions comprising these luster pigments.

The invention pertains to the field of effect pigments, i.e. reflecting flat particles having a radiation reflection which, depending on the angle to the flat surface, is of varying brightness and/or has a different reflection spectrum. In the case of a surface painted with effect pigments for example, the effect pigment particles will, within the coating, substantially align themselves parallel to the surface, so that the coloured paint surface which is illuminated by a fixed white light source, may, depending on the visual angle and consistency of the effect pigment, have different colours. Therefore, effect pigments which are, for example, incorporated in a paint coat applied to an automotive carriage raise the attractiveness of this vehicle and consequently also its value.

The light falling on an effect pigment is for the most part reflected, but to a smaller part it is also absorbed. Applying thin layers to the flat pigment core results in interference phenomena, the intensity and the spectrum of the reflected ray varying depending on the angle of incidence and visual angle.

Conventional interference pigments consist of a core in platelet form which is encapsulated by colourless oxides such as titanium dioxide. The titanium dioxide in this case is preferably in a highly crystalline form, typically rutile (EP 271 767). A further layer may be applied thereto which, where present, usually consists of a coloured inorganic substance such as iron oxide. The chroma of such pigments, however, is usually not satisfactory.

According to EP 381 047, organic pigments in platelet form may also be suitable as core, but the choice is restricted to only few pigments, such as β-phthalocyanine, fluororubine and red perylene, and the preparation of suitable organic pigments in platelet form is not easy. WO 93/08237 proposes a further improvement wherein a matrix coloured with pigments serves as core which consists, for example, of silicon dioxide, silicates, boroxide, borates, aluminium oxide, aluminates or other materials having similar properties.

According to DE 38 08 070, pigments of a particularly blue cast are obtained by after-treating titanium-coated mica with ammonia at about 800° C., the coloration resulting from the coupled and inseparable influence of oxidic titanium(III) compounds, which are suspected to be blue, and dark titanium monoxide. This, however, results in an undesirable strong light absorption in the outermost layer of the pigment. Conversely, according to DE 34 33 657 it is also possible to coat mica with a first layer of lower oxides of titanium and with a second layer of titanium dioxide. However, both processes are elaborate and require very high temperatures so that they are only suitable for coating mica or substances which are similarly resistant to calcination.

U.S. Pat. No. 5,135,812 proposes the use of pigment particles which are formed by multiple layers of dielectrica. Owing to the number of layers required, the preparation of such particles is difficult and the reflection colours have low chroma. U.S. Pat. No. 5,135,812 therefore prefers particles having a reflecting metallic core, a dielectric layer (e.g. $SiO_2$, $MgF_2$ or $Al_2O_3$) and a semi-transparent metal layer (e.g. Cr). The semi-transparent metal layer can also form part of the dielectric layer and is then a substantially crystalline so-called cermet (e.g. Cr or Ni encapsulated in SiO or $SiO_2$, as described in EP 27 718).

However, minimal deviations in the layer thickness or in the concentration of the metal result in undesirable changes in shade, in particular in the case of multiple layers, requiring a very expensive exact control of the coating process in order to obtain a high quality product. In addition, heavy metals can mostly only be vapour-deposited at very high temperatures, or then only starting from toxic compounds such as metal carbonylene. The use of heavy metals is also undesirable for ecological reasons and they are very expensive in the form and purity required for vapour deposition, and exfoliated particles may create problems such as that of wearing out the jet during spraying. As disclosed in EP 571 836 and EP 668 329, such metal layers should furthermore preferably be microcrystalline and, owing to their unsatisfactory ecological stability, they should be equipped with an additional highly refractive protective layer. And, lastly, such metal layers are intrinsically also black so that also in this case the chroma obtained is relatively low.

DE 43 41 162 discloses coloured coatings which consist of dielectric layers containing alternating different amounts of colour composition, where the dielectric may be silicon dioxide, and which layers may, if desired, be exposed to an oxygen partial pressure to enhance the oxidation. However, such coatings are not at all suitable as pigments.

Finally, WO 94/03774 discloses optoanalytic methods and apparatus, wherein a silicon wafer is coated with a 55 nm (550 Å) silicon monoxide, resulting in a golden interference colour. A bisaminosilane layer is additionally applied to the silicon monoxide. The surface of such detectors is intended for single brief use in medical analytics and, owing to its high chemical susceptibility, is completely unsuitable for coating pigments.

One aim of this invention was to provide high-grade effect pigments which impart highly saturated and bright colours under all visual angles to the medium in which they are incorporated and where the colour difference between a flat and a steep visual angle should visually be as big as possible (high goniochromaticity).

Accordingly, those effect pigments were especially desired which result in as high as possible a chroma when combined with conventional transparent coloured pigments.

A further aim of the invention was to provide effect pigments which are free of heavy metals and which can be disposed of in ecologically safe manner.

Another aim of the invention was also to provide effect pigments which can be prepared by methods which are as simple as possible, relatively inexpensive and which give a high yield.

And lastly, it was also an aim of this invention to make possible the precise reproduction of effect pigments of different colours with little elaboration according to the same principle, only few parameters needing to be changed in each case to obtain the different desired colours.

Surprisingly, these aims could be met to a particularly high degree with the pigments of this invention.

Accordingly, the invention relates to a coloured pigment, comprising
(a) a core consisting of a substantially transparent or metallic reflecting material, and
(b) at least one coating consisting essentially of one or more than one silicon oxide, wherein the molar ratio of oxygen to silicon at the average value of coating (b) is from 0.25 to 0.95.

The core is normally a particle in platelet form which is known or which can be prepared by known methods and which is 1 to 200 μm long, 1 to 200 μm wide and 0.01 to 5 μm thick, particularly preferably 1 to 50 μm long, 1 to 50 μm wide and 2 μm thick. These pigment particles can be incorporated in a high molecular weight organic material in conventional manner in order to colour said material.

However, it is also possible to build the novel coatings direct on a substrate to be coloured having at least one dimension which is greater than 200 μm, the substantially smooth surface of which serving in this case as core. A substantially smooth surface does not preclude a surface roughness of up to about 2 μm and may be flat or also of any three-dimensional shape (e.g. a piece of metal sheet or wire). In this case the pigmentation is produced direct on the substrate concurrently with the production of the novel coating consisting of one or more than one silicon oxide of the composition $SiO_{0.25}$ to $SiO_{0.95}$, in which case the tinting properties of the novel coating are of the greatest benefit. The detour of using pigment particles as colour transmitters becomes unnecessary.

Accordingly, the invention also relates to a coated transparent or metallic reflecting substrate which has a substantially smooth surface and at least one dimension which is greater than 200 μm, comprising a layer of one or more than one silicon oxide and wherein the molar ratio of oxygen to silicon at the average value of this silicon oxide layer is from 0.25 to 0.95.

In both cases, the core consists of a substantially transparent or, preferably, metallic reflecting material.

If the core consists of a metallic reflecting material, said material is preferably Ag, Al, Au, Cu, Cr, Ge, Mo, Ni, Si, Ti, the alloys thereof, graphite, $Fe_2O_3$ or $MoS_2$, particularly preferably Al or $MoS_2$. Depending on the material, a natural non-interfering oxide layer may form on the surface of the core. Very particularly preferred effect pigments have a core which reflects at least 35% of the light falling vertically on its surface in the range from 380 to 800 nm.

On the other hand, the core may also consist of a substantially transparent material. This will be understood as being a material having an absorption coefficient k in the range from 380 to 800 nm which is no more than 0.02. If the core consists of a substantially transparent material, said material is preferably mica.

Coating (b) consists essentially of silicon oxides, the molar ratio of oxygen to silicon at the average value of coating (b) being from 0.25 to 0.95, preferably from 0.6 to 0.8. The layer thickness of coating (b) is preferably from 10 to 500 nm, particularly preferably from 70 to 500 nm. The ESCA data (electron spectroscopy for chemical analysis) show that this is usually an intimate and substantially amorphous mixture of compounds with silicon in different states of oxidation, but the exact structure is not known. Surprisingly, it has been found all the same that coating (b) of the cited composition has an unexplained decisive influence on the optical properties of the novel pigments.

The purity of coating (b) is not critical. It is therefore a very particular advantage of this invention that it is possible to forego the use of high-purity silicon as starting material. Instead it is possible to prepare coating (b) starting from inexpensive ordinary silicon, typically from silicon containing 98% by weight of Si (S-1194, Cerac Inc.) or 97% by weight of Si (85353, Fluka AG). The other chemicals neither need to be extremely pure. In the case of, for example, vapour deposition in the presence of oxygen, it is sufficient to use oxygen having a 98% volume content or even air enriched with oxygen having an oxygen content of only 95 or 90% volume.

Accordingly, coating (b) can contain further components, the total amount of which however, where present, should usually be kept as low as possible, conveniently at less than 10% by weight.

The novel luster pigments preferably comprise a further coating, which is different from the first-mentioned coating.

Accordingly, the invention also relates to a coloured luster pigment, comprising (a) a core consisting of a substantially transparent or metallic reflecting material, (b) at least one coating consisting essentially of one or more than one silicon oxide, and (c) at least one further coating which is applied on the same side of core (a) as coating (b) and which consists of any solid material, the composition of which coating is different from that of coating (b), in any relative arrangement of coatings (b) and (c) in relation to core (a), wherein the molar ratio of oxygen to silicon at the average value of coating (b) is from 0.25 to 0.95.

Coating (c) can also be additionally applied to a smooth substrate having at least one dimension which is greater than 200 μm.

The solid material of coating (c) is preferably a metal oxide, typically $TiO_2$, $ZrO_2$, SiO, $SiO_2$, $SnO_2$, $GeO_2$, ZnO, $Al_2O_3$, $V_2O_5$, $Fe_2O_3$, $Cr_2O_3$, $PbTiO_3$ or CuO, or a mixture thereof. However, coating (c) can also consist, for example, of any of the many dielectric materials which are also very well known to the skilled person, the specific electric resistance of which materials being at least $10^{10}$ Ω·cm according to the standard definition.

The relative arrangement of coatings (b) and (c) in relation to core (a) may be in any order. In a first embodiment of this invention, coating (b) is between core (a) and coating (c), which latter preferably has a layer thickness of 0.1 to 200 nm.

In this first embodiment, the function of coating (c) is mainly a protective one, so that its refractive index can be chosen without any restrictions. Therefore, the material chosen for coating (c) will usually be one which can be easily coated and which gives a stable layer. Coating (c) may also form in natural manner from the surface of applied coating (b) which is first applied, which natural process terminates by itself due to the passivation of the surface. It is probable that silicon dioxide forms during this process since the molar ratio of oxygen to silicon near the surface rises by about 0.1 to 0.2. If desired, this natural process can also be accelerated, typically by exposure to oxygen and/or humidity in the temperature range from preferably 20° C. to 250° C., particularly preferably from 60° C. to 120° C.

A second embodiment of this invention is that, wherein coating (c) is between core (a) and coating (b), which latter in particular has a layer thickness of 70 to 500 nm, preferably of up to 300 nm, particularly preferably of 100 to 250 nm. In this second embodiment of the invention the refractive index of coating (b) is preferably at least 1.7. The function of coating (c) in this second embodiment is mainly to produce goniochromaticity by interference phenomena.

In both cases the material of coating (c) consists particularly preferably of one or more than one metal oxide or of one or more than one metal fluoride, very particularly preferably of one or more than one oxide or mixed oxide of Si, Ti, Zn, Sn, Ge, Zr, Al, Fe, V, Ni, Co, Cu, Cr or Pb, or of one or more than one fluoride of Mg or Ca, particularly preferably of $SiO_2$.

The material of coating (c) preferably consists of one or more than one of the above-mentioned substances, each optically effective component of coating (c) being substantially transparent when viewed in isolation. Optically effective components are those, the absence of which in coating (c) results in a colour change of the effect pigment so that a ΔE* value (CIE-L*A*B*) of more than 2 is obtained in clear coatings containing 2 g/m² of effect pigment on a black substrate at a 10° visual angle under the standard illuminant $D_{65}$. Substantially transparent components are understood to be those having an absorption coefficient k in the range from 380 to 800 nm of no more than 0.02.

A very particularly preferred effect pigment is that wherein the material of coating (c) consists of one or more than one silicon oxide, the molar ratio of oxygen to silicon at the average value of (c) being from 1.0 to 2.0 and the refractive indices of coatings (b) and (c) differing by at least 0.1, the ratio of oxygen to silicon at the average value of coating (c) preferably being from 1.5 to 2.0 and the refractive indices of coatings (b) and (c) preferably differing by at least 0.2. It is a particular advantage that both coatings (b) and (c) can be prepared from the same educts.

Particularly preferred pigments of this invention are those of the above-described first embodiment, wherein coating (b) has a layer thickness of 70 to 500 nm, as well as those of the above-described second embodiment, wherein coating (b) has a layer thickness of 10 to 500 nm.

Coating (b) obtains already under the coating conditions a morphology suitable for use in the pigment field and advantageous optical properties, in particular when the temperature is in the range from 20° C. to 120° C. Therefore, as an additional advantage, the subsequent heat treatment required for many known effect pigments becomes unnecessary, e.g. the rutilisation at 850° C. as described in EP 271 767 or the reduction of titanium dioxide to low titanium oxides at 750° to 850° C. described in DE 38 08 070. A very particular advantage of this invention is also that a coating (b) can also be applied in the case of particles having a core which does not resist thermal stress, such as aluminium flakes.

Surprisingly, it has been found that it is even advantageous if coating (b) has a substantially amorphous character so that the temperature should preferably not exceed 250° C. during the application as well as during an optional heat aftertreatment. It has also to be kept in mind that high temperatures usually result in the unwanted degradation of coating (b).

However, it is still possible to carry out a gentle thermal aftertreatment in the temperature range from 20° C. to about 120° C. to at most 250° C. Therefore, a preferred pigment is that wherein the morphology and the optical properties of coating (b) are obtained in the temperature range from 20° C. to 250° C., preferably in the range from 60° C. to 120° C.

Besides coatings (b) and (c), the pigment may have one or several further conventional coatings, for example an additional protective layer or one or more than one intermediate layer. It may also be preferred to use also in this case substances which are substantially transparent when viewed in isolation. This criterion is generally preferred, except in the case of coating (b), as it results in higher luminescence. On the other hand, the appearance of a colour of its own which is hard to detect in mixtures of substances which are substantially transparent may be acceptable.

However, a preferred embodiment of this invention is a pigment, wherein coatings (b) and (c) are in direct contact and wherein the refractive indices of coatings (b) and (c) differ by at least 0. 1, preferably by at least 0.2.

Coatings (b) and (c) are preferably applied in immediate succession, the application process simply being continued after the oxygen partial pressure is changed.

It is usually advantageous if coating (b) and, where present, coating (c) are each applied to both sides of core (a). However, the novel pigment preferably contains no other layers over and above these, with the possible exception of a protective layer. A protective layer can consist of any transparent dielectric according to the above definition, preferably of a high molecular weight organic material, and its application is particularly useful if coating (b) is on the outer side.

Therefore, another preferred pigment is that comprising at least two coatings (b) and (b'), consisting essentially of one or more than one silicon oxide, and at least two further coatings (c) and (c'), consisting of a solid material, wherein (b) and (b'), and (c) and (c'), respectively, have the same composition and layer thickness and are each arranged in mirror symmetry in relation to core (a). A particularly preferred pigment is that which consists exclusively of this composition and which has an optional surface protective coating.

In any case it is always preferred to use a pigment, wherein core (a) as well as all coatings applied thereto have substantially uniform layer thicknesses. Substantially uniform will be undertstood as meaning a layer thickness which varies by no more than ±2% of the average layer thickness.

Application according to this invention may be carried out by per se known methods, typically by vacuum evaporation, sputtering or chemical vapor deposition or, in the case of some layers, by wet chemical methods known therefor which are described, inter alia, in WO 93/08237 and in the further literature cited therein. General methods for vacuum evaporation, sputtering or chemical vapor deposition are very well known to the skilled person. In these methods it is convenient to work under vacuum, the pressure during the coating process being from $10^{-1}$ to $10^{-8}$ Pa.

Conveniently, the pressure should not exceed the threshold value above which vacuum evaporation, sputtering or chemical vapor deposition fail. Depending on the apparatus, this threshold value is from about $10^{-2}$ to $10^{-1}$ Pa. Metal oxides, with the exception of silicon oxides, are preferably vapour-deposited at a pressure of $1.3 \cdot 10^{-2}$ to $1.3 \cdot 10^{-3}$ Pa.

Fluorides are preferably coated wet chemically, and oxides are preferably coated wet chemically or by vapour deposition, sputtering or by chemical separation from the vapour phase, but other coating methods known to the skilled person can of course also be used.

Silicon oxides are particularly preferably coated by vapour deposition of metallic silicon in the presence of oxygen. For vapour deposition, silicon, which need not absolutely be pure, is heated in the presence of gaseous (molecular) oxygen, which also need not absolutely be pure, under reduced pressure and adjacent to the substrate to be coated to a high temperature, e.g. in the range from 500° C. to 2000° C. by induction or using an electron gun.

Surprisingly, it has been found that a ratio of silicon to oxygen at a given vapour deposition rate can be precisely controlled by adjusting the oxygen partial pressure. A vapour deposition rate of 0.2 nm·s$^{-1}$ at an oxygen partial pressure of about $3.0 \cdot 10^{-4}$ Pa gives a coating of formula $SiO_{0.25}$; an oxygen partial pressure elevated slightly to about $1.8 \cdot 10^{-3}$ Pa gives a coating of formula $SiO_{0.95}$; and an oxygen partial pressure of about $1.9 \cdot 10^{-3}$ Pa gives a coating of formula $SiO_{1.0}$. A coating of formula $SiO_{1.5}$ requires an oxygen partial pressure of about $5 \cdot 10^{-3}$ Pa. On the other hand, those coatings which consist mainly of $SiO_2$, are only obtained at a substantially higher oxygen partial pressure which should conveniently be at least $1.0 \cdot 10^{-2}$ Pa, preferably at least $2.0 \cdot 10^{-2}$ Pa (of course, the maximum acceptable or recommended working pressure of the apparatus used should not be exceeded). A coating of $SiO_2$ can also be vapour-deposited starting from SiO or $SiO_2$ instead of from metallic silicon, in which case the oxygen partial pressure may also be lower than $1.0 \cdot 10^{-2}$ Pa.

The invention therefore also relates to a process for coating a substrate with a coating consisting essentially of one or more than one silicon oxide, the molar ratio of oxygen to silicon at the average value being from 0.25 to 0.95, by vacuum evaporation, sputtering or chemical vapor deposition of metallic silicon in the presence of gaseous oxygen at an oxygen partial pressure of $3.0 \cdot 10^{-4}$ Pa to $1.8 \cdot 10^{-3}$ Pa. The substrate may be a pigment core which is coated or not coated, or a substrate having at least one dimension which is greater than 200 µm and having a substantially smooth surface.

Particularly advantageous is the particularly preferred variant of vapour deposition wherein coating (b) as well as a coating (c), which consists of metallic silicon, are applied in immediate succession in the presence of oxygen, the partial pressure of which is changed during the transition of coating (b) to coating (c).

The invention therefore also relates to a process for coating a substrate with two coatings (b") and (c"), each consisting essentially of one or more silicon oxide, by vacuum evaporation, sputtering or chemical vapor deposition of metallic silicon in the presence of gaseous oxygen, wherein the molar ratio of oxygen to silicon at the average value of coating (b") is from 0.25 to 0.95, the molar ratio of oxygen to silicon at the average value of coating (c") is from 1.0 to 2.0, and the oxygen partial pressure is changed in the course of the coating process.

The refractive indices of coatings (b") and (c") preferably differ by at least 0.1. The relative arrangement of coatings (b") and (c") in relation to the substrate can be of any order and only depends on whether the oxygen partial pressure is raised or lowered in the course of the application process. The oxygen partial pressure to be changed is usually in the range from $3.0 \cdot 10^{-4}$ Pa to at least $2.0 \cdot 10^{-2}$ Pa and depends on the desired molar ratios of oxygen to silicon, the threshold value to be crossed between coatings (b") and (c") being from about $1.8 \cdot 10^{-3}$ Pa to $1.9 \cdot 10^{-3}$ Pa.

To prepare the novel pigments it is possible to use e.g. commercially available core particles in the form of bulk material, e.g. mica or aluminium platelets which can typically be produced in simple manner by punching them out from aluminium foil or by conventional atomising or grinding techniques. Care should be taken, however, that the surface is substantially free of fats or other films. Coating of the bulk material by non-wet chemical methods is carried out e.g. in a fluidised bed reactor, as described EP 33 457, DE 38 13 335 or EP 571 836.

However, it is also possible to prepare the novel pigments in a belt process, wherein the pigment cores are also formed as a continuous layer on the belt. When all coatings are applied, the entire multiple coating can be peeled from the belt and the pigment particles are comminuted to the desired size. Such processes are well known to the skilled person and good descriptions thereof are also given, inter alia, in US 5,135,812 and WO 93/08237. In the case of transparent as well as of metallic reflecting core materials it is, in principle, possible to use any coating method known therefor.

The novel pigments give brilliant, highly saturated and bright (luminescent) colours and are therefore very particularly suited for being combined with conventional transparent pigments, typically with organic pigments such as diketopyrrolopyrroles, quinacridones, dioxazines, perylenes, isoindolinones, and the like. In this case, the transparent pigment can have a similar colour to that of the effect pigment. Particularly interesting combination effects, however, are obtained in accordance with EP 388 932 or EP 402 943 if the colour of the transparent pigment and that of the effect pigment are complementary.

Novel pigments of the second embodiment of this invention, the coatings of which result in interference phenomena based on the respective layer thicknesses and refractive indices, have a high goniochromaticity. Surprisingly, however, the other novel pigments also have surprisingly good colorations, among them also those wherein, based on the respective layer thicknesses and refractive indices, a goniochromaticity is obtained which is negligible. All pigments of this invention can be excellently used for pigmenting high molecular weight organic material.

The high molecular weight organic material for the pigmenting of which the novel pigments or pigment compositions can be used, may be of natural or synthetic origin. High molecular weight organic materials normally have a molecular weight of about $10^3$ to $10^7$ g/mol or even more. Said materials may be, for example, natural resins, drying oils, rubber or casein, or natural substances derived therefrom such as chlorinated rubber, oil-modified alkyd resins, viscose, cellulose ethers or cellulose esters, typically ethyl cellulose, cellulose acetate, cellulose propionate, cellulose acetobutyrate or nitrocellulose, but particularly preferably fully synthetic organic polymers (duroplasts and thermoplasts) as obtained, for example, by polymerisation, polycondensation or polyaddition. Materials to be mentioned of the polymerisation resin class are preferably polyolefins, such as polyethylene, polypropylene or polyisobutylene, and also substituted polyolefins, such as polymers of vinyl chloride, vinyl acetate, styrene, acrylonitrile, acrylate or methacrylate, or butadiene, as well as copolymers of the cited monomers such as, in particular, ABS or EVA.

Condensates to be mentioned of the polyaddition resin and polycondensation resin series are those of formaldehyde with phenols, the so-called phenoplasts, and the condensates of formaldehyde with urea, thiourea and melamine, the so-called aminoplasts, the polyesters used as paint resins, including saturated ones such as alkyd resins, as well as unsaturated ones such as maleinate resins, and also the linear polyesters and polyamides, polyurethanes or silicons.

The cited high molecular weight compounds may be obtained singly or in admixture, in the form of plastic compounds or melts. They may also be obtained in the form of their monomers or, in polymerised state, in dissolved form as film formers or as binders for paints or printing inks, typically boiled linseed oil, nitrocellulose, alkyd resins, melamine resins and urea/formaldehyde resins or acrylic resins.

Depending on their end use requirements, it is expedient to use the novel effect pigments or effect pigment compositions as toners or in the form of preparations. Depending on the conditioning process or purpose of application it may be advantageous to add specific amounts of texture improvers to the effect pigments before or after the conditioning process, provided these have no adverse effect when the effect pigments are used for colouring high molecular weight organic materials, in particular polyethylene. Said texture improvers may preferably be fatty acids having at least 18 carbon atoms, typically stearic acid or behenic acid, or the amides or metallic salts thereof, preferably Mg salts, as well as plastifiers, waxes, colophonic acids such as abietic acid, colophonium soap, alkyl phenols or aliphatic alcohols, typically stearyl alcohol or aliphatic 1,2-dihydroxy compounds having 8 to 22 carbon atoms, such as 1,2-dodecanediol, and also modified colophonium maleinate resins or fumaric acid colophonium resins. The texture improvers are added in amounts of preferably 0.1 to 30% by weight, in particular of 2 to 15% by weight, based on the end product.

The novel effect pigments may be added to the high molecular weight organic material in any tinctorially effective amount. A convenient composition to be pigmented is that comprising a high molecular weight organic material and from 0.1 to 30% by weight, preferably from 1 to 20% by weight, of a novel pigment, based on the high molecular weight organic material. In practice it is often possible to use concentrations of about 10% by weight.

For pigmenting organic materials, the novel effect pigments can be used singly. However, it is also possible to add, in addition to the novel effect pigments, other chromophoric components, such as white, coloured, black or effect pigments in any amount in order to obtain different shades or colour effects. Coloured pigments used in admixture with the novel effect pigments are preferably employed in a total amount of 0.1 to 10% by weight, based on the high molecular weight organic material. A particularly high goniochromaticity is obtained in the preferred combination of a novel effect pigment with a coloured pigment of a different, preferably complementary, colour, the colorations of the effect pigment and the colorations of the coloured pigment having a difference in hue ($\Delta H^*$) of 20 to 340, preferably of 150 to 210, at a 10° measuring angle.

The novel effect pigments are preferably combined with transparent coloured pigments, and said transparent pigments can be the either in the same medium as the novel effect pigments or in an adjacent medium. An example of an arrangement wherein the effect pigment and the coloured pigment are expediently present in adjacent media is a multi-layer effect coloration.

Pigmenting the high molecular weight organic materials with the novel pigments is typically carried out by mixing such a pigment, optionally in the form of a masterbatch, with these substrates, using rolls, or mixing or grinding apparatus. The pigmented material is then brought into the desired final shape by per se known processes such as calendering, moulding, extruding, coating, casting or injection moulding.

All additives customarily used in the plastic industry can be incorporated in customary amounts before or after incorporating the pigment into the polymers. In order to produce non-brittle mouldings, or to reduce their brittleness, it is particularly desirable to incorporate plastifiers, typically phosphate, phthalate or sebacate, in the high molecular weight compounds prior to moulding.

To pigment paints and printing inks, the high molecular weight organic materials and the novel effect pigments, if desired together with conventional additives such as fillers, other pigments, siccatives or plastifiers, are finely dispersed or dissolved in a common organic solvent or solvent mixture. This may be done by dispersing or dissolving the individual components by themselves or also several together and only then bringing together all components.

For dispersing a novel effect pigment in the high molecular weight organic material to be pigmented and for processing a novel pigment composition, it is preferred to observe conditions under which only relatively weak shear forces occur so that the effect pigment is not divided into smaller fragments. The acceptable shear force corresponds more or less to that which is acceptable for core (a), the gentle dispersion of which in a high molecular weight organic material is generally well known to the skilled person.

The colorations obtained, for example in plastic materials, paints or printing inks, preferably in paints or printing inks and, particularly preferably, in paints, are distinguished by excellent properties, in particular by high chroma, high brightness and excellent fastness properties, and in the case of interference pigments, also by high goniochromaticity.

Where the high molecular weight organic material to be pigmented is a paint, it is preferably a special paint and, very particularly preferably, an automotive lacquer.

The following examples illustrate the invention in more detail:

EXAMPLES 1–4

A 4×4 cm flat piece of glass used as target material is placed in a vacuum chamber (BAK 600, Balzers AG) in which different inserted substances can be vaporized selectively using an electron gun. Under a residual nitrogen pressure of $\leq 1\cdot 10^{-3}$ Pa and at a rate of 0.3 nm·s$^{-1}$, a 50 mm layer of metallic aluminium is first built from added aluminium and subsequently, under a pressure of $P_x$ Pa of pure oxygen and at a rate of 0.2 nm·s$^{-1}$, a $d_x$ nm and substantially amorphous layer of the composition $SiO_x$ is coated thereon from added silicon (BD 481173-T, 1–5 mm, Balzers AG).

The layers appear in brilliant colours under all visual angles.

The layer thickness $d_x$ of the $SiO_x$ layer is determined using a microscanner, the stoichiometric value x of the $SiO_x$ layer is determined by ESCA, and the reflection colour (CIE-L*C*h) is determined at an irradiation with standard illuminant $D_{65}$ under a 10° visual angle.

| Example | $p_x$ [$-10^{-3}$ Pa] ($O_2$ pressure) | $d_x$ [nm] (layer thickness) | x in $SiO_x$ (stoichiometric value) | L* (lightness) | C* (chroma) | h (hue) |
|---|---|---|---|---|---|---|
| 1 | 0.35 | 104 | 0.35 | 65 | 50 | 359 |
| 2 | 1.00 | 100 | 0.82 | 86 | 71 | 90 |
| 3 | 0.55 | 101 | 0.43 | 82 | 54 | 70 |
| 4 | 0.55 | 90 | 0.43 | 82 | 41 | 70 |

N.B. Depending on the apparatus used, the ESCA values can have a relative inaccuracy of up to about 20%.

EXAMPLES 5–11

A 4×4 cm flat piece of glass used as target material is placed in a vacuum chamber (BAK 600, Balzers AG) in which different inserted substances can be vaporized selectively using an electron gun. At a residual nitrogen pressure of $\leq 1 \cdot 10^{-3}$ Pa and at a rate of 0.3 nm·s$^{-1}$, a 50 nm layer of metallic aluminium is first built from added aluminium and subsequently, under an oxygen pressure of $6 \cdot 10^{-3}$ Pa and at a rate of 0.2 nm·s$^{-1}$, a $d_2$ nm layer of $SiO_2$ is coated thereon from added silicon dioxide (BD 481689-T, Balzers AG: 99.9% $SiO_2$). Under an oxygen pressure reduced to $p_x$ Pa and at a rate of 0.2 nm·s$^{-1}$, a $d_x$ nm and substantially amorphous layer of the composition $SiO_x$ is then coated thereon from added silicon (BD 481173-T, 1–5 mm, Balzers AG).

The layers appear in brilliant shades under all visual angles.

The layer thicknesses $d_2$ of the $SiO_2$ layer and $d_x$ of the $SiO_x$ layer are determined using a microscanner, the stoichiometric value x of the $SiO_x$ layer is determined by ESCA, and the reflection colour (CIE-L*C*h) is determined at irradiation with standard illuminant $D_{65}$ under a 10° visual angle.

| Example | $d_2$ [nm] (layer thickness) | $d_x$ [nm] (layer thickness) | $p_x$ [$-10^{-3}$ Pa] ($O_2$ pressure) | x in $SiO_x$ (stoichiometric value) | L* (lightness) | C* (chroma) | h (hue) |
|---|---|---|---|---|---|---|---|
| 5 | 118 | 101 | 0.5 | 0.43 | 76 | 24 | 175 |
| 6 | 155 | 101 | 0.55 | 0.43 | 82 | 44 | 134 |
| 7 | 118 | 90 | 0.55 | 0.43 | 63 | 30 | 290 |
| 8 | 155 | 90 | 0.55 | 0.43 | 79 | 44 | 147 |
| 9 | 125 | 55 | 0.5 | 0.41 | 89 | 49 | 71 |
| 10 | 155 | 55 | 0.5 | 0.41 | 90 | 48 | 73 |
| 11 | 197 | 55 | 0.5 | 0.41 | 83 | 27 | 197 |

The goniochromaticity of the samples of Examples 5, 6, 7, 8 and 11 which, depending on the visual angle, look pink to green, is particularly pronounced.

The product of Example 11 is measured from different visual angles.

| Example | Measuring angle | Colour | L* (lightness) | C* (chroma) | h (hue) |
|---|---|---|---|---|---|
| 11 | 10° | greenish | 83 | 27 | 197 |
| 11 | 15° | blueish | 82 | 23 | 211 |
| 11 | 45 | pink | 74 | 32 | 339 |
| 11 | 75° | yellow | 84 | 44 | 93 |

EXAMPLES 12–13

Example 11 is repeated, but replacing aluminium with titanium or molybdenum.

| Metal | $d_2$ [nm] (layer thickness) | $d_x$ [nm] (layer thickness) | $p_x$ [$-10^{-3}$ Pa] ($O_2$ pressure) | x in $SiO_x$ (stoichiometric value) | L* (lightness) | C* (chroma) | h (hue) |
|---|---|---|---|---|---|---|---|
| Ti | 195 | 55 | 0.5 | 0.41 | 70 | 47 | 208 |
| Mo | 195 | 55 | 0.5 | 0.41 | 62 | 43 | 225 |

EXAMPLE 14–15

Example 10 is repeated, but replacing silicon dioxide with magnesium fluoride or titanium dioxide.

| Dielectr. | $d_{diel}$ [nm] (layer thickness) | $d_x$ [nm] (layer thickness) | $p_x$ [$-10^{-3}$ Pa] ($O_2$ pressure) | x in $SiO_x$ (stoichiometric value) | L* (lightness) | C* (chroma) | h (hue) |
|---|---|---|---|---|---|---|---|
| $MgF_2$ | 160 | 55 | 0.5 | 0.41 | 87 | 36 | 34 |
| $TiO_2$ | 140 | 55 | 0.5 | 0.41 | 84 | 25 | 198 |

EXAMPLES 16–21

A 4×4 cm flat piece of glass used as target material is placed in a vacuum chamber (BAK 600, Balzers AG) in which different inserted substances can be vaporized selectively using an electron gun. At a residual nitrogen pressure of $\leq 1 \cdot 10^{-3}$ Pa and at a rate of 0.3 nm·s$^{-1}$, a 50 nm layer of metallic aluminium is first built from added aluminium and subsequently, under an oxygen pressure of $P_x$ Pa and at a rate of 0.2 nm·s$^{-1}$, a $d_x$ nm and substantially amorphous layer of the composition $SiO_x$ is coated thereon from added silicon (BD 481173-T, 1–5 mm, Balzers AG). Under an oxygen pressure elevated to $6 \cdot 10^{-3}$ Pa and at a rate of 0.2 nm·s$^{-1}$, a $d_2$ nm layer of $SiO_2$ is coated thereon from added silicon dioxide (BD 481689-T, Balzers AG: 99.9% $SiO_2$).

The layers appear in brilliant colours under all visual angles.

The layer thicknesses $d_2$ of the $SiO_2$ layer and $d_x$ of the $SiO_x$ layer are determined using a microscanner, the stoichiometric value x of the $SiO_x$ layer is determined by ESCA, and the reflection colour (CIE-L*C*h) is determined at irradiation with standard illuminant $D_{65}$ under a 10° visual angle.

an oxygen partial pressure of $2.0 \cdot 10^{-3}$ Pa. The results are comparable to those of Examples 5–13 and 16–21.

EXAMPLE 35

A 10×30 cm and 75 µm piece of cellulose acetate foil (AC 311075, Goodfellow Inc.) used as target material is placed in a vacuum chamber (BAK 600, Balzers AG) in which different inserted substances can be vaporized selectively using an electron gun. Subsequently, the following layers are built thereon:

- a 100 nm layer of $SiO_2$ from added silicon dioxide under an oxygen pressure of $6 \cdot 10^{-3}$ Pa and at a rate of 0.2 nm·s$^{-1}$,
- a 100 nm layer of the composition $SiO_{0.41}$ from added silicon under an oxygen pressure of $0.5 \cdot 10^{-3}$ Pa and at a rate of 0.2 nm·s$^{-1}$,
- a 50 nm layer of metallic aluminium from added aluminium under a residual nitrogen pressure of $\leq 1 \cdot 10^{-3}$ Pa and at a rate of 0.3 nm·s$^{-1}$,
- a 100 nm layer of the composition $SiO_{0.41}$ from added silicon under an oxygen pressure of $0.5 \cdot 10^{-3}$ Pa and at a rate of 0.2 nm·s$^{-1}$,
- a 100 nm layer of $SiO_2$ from added silicon dioxide under an oxygen pressure of $6 \cdot 10^{-3}$ Pa and at a rate of 0.2 nm·s$^{-1}$.

| Example | $d_x$ [nm] (layer thickness) | $p_x$ [$-10^{-3}$ Pa] ($O_2$ pressure) | (stoichiometric value) | x in $SiO_x$ $d_2$ [nm] (layer thickness) | L* (lightness) | C* (chroma) | h (hue) |
|---|---|---|---|---|---|---|---|
| 16 | 85  | 0.45 | 0.39 | 125 | 82 | 40 | 85 |
| 17 | 98  | 0.5  | 0.41 | 125 | 80 | 42 | 89 |
| 18 | 113 | 0.3  | 033  | 125 | 76 | 45 | 63 |
| 19 | 85  | 0.45 | 0.39 | 197 | 80 | 77 | 83 |
| 20 | 98  | 0.5  | 0.41 | 197 | 81 | 80 | 85 |
| 21 | 113 | 0.3  | 0.33 | 197 | 73 | 67 | 61 |

EXAMPLES 22–34

Examples 5–13 and 16–21 are repeated, but replacing the silicon dioxide used as starting material for vapour-depositing the silicon dioxide layer with metallic silicon at This operation is repeated several times using new pieces of cellulose acetate foil each time until the desired total surface is coated. Then all pieces of cellulose acetate foil are treated together at room temperature in an ultrasound bath filled with water. The resulting suspension is filtered and the product obtained is washed with water and dried, giving a brilliant yellow pigment powder.

EXAMPLE 36

The following paint components are dispersed together in a disperser (®Dispermat) for 60 minutes at 1500 rpm:
1.0 g of the pigment obtained according to Example 31;
13.4 g of CAB solution consisting of
- 41.0 parts by weight of 20% cellulose acetobutyrate in butanol/xylene 2:1 (®CAB 531.1, Eastman Chem.)
- 1.5 parts by weight of zirconium octoate,
- 18.5 parts by weight of ®Solvesso 150* (ESSO),
- 21.5 parts by weight of butyl acetate and
- 17.5 parts by weight of xylene;

5.0 g of polyester resin (®Dynapol H700, Dynamit Nobel); and
0.6 g of melamine resin (®Maprenal MF 650, Hoechst).

The paint so obtained is applied with a film drawing apparatus (wet film thickness 100 μm) to a suitable surface (black/white striped cardboard, Leneta Co.) and, after a flashing off time of 30 minutes at room temperature, stoved for 30 minutes at 130° C.

A golden brilliant shade is obtained which has a marked metallic effect as well as excellent fastness to light and weathering.

EXAMPLE 37

Example 36 is repeated, but building up a pigment having the following order of layers analogous to Example 35:
- a 100 nm layer of the composition $SiO_{0.82}$ from added silicon under an oxygen pressure of $1.0 \cdot 10^{-3}$ Pa and at a rate of 0.2 nm·s$^{-1}$.
- a 50 nm layer of metallic aluminium from added aluminium under a residual nitrogen pressure of $\leq 1 \cdot 10^{-3}$ Pa and at a rate of 0.3 nm·s$^{-1}$.
- a 100 nm layer of the composition $SiO_{0.82}$ from added silicon under an oxygen pressure of $1.0 \cdot 10^{-3}$ Pa and at a rate of 0.2 nm·s$^{-1}$.

A brilliant yellow coloration is obtained which has excellent fastness to light and weathering.

We claim:

1. A coloured pigment, comprising
   (a) a core consisting of a substantially transparent or metallic reflecting material, and
   (b) at least one coating consisting essentially of one or more than one silicon oxide, wherein the average molar ratio of oxygen to silicon of coating (b) is from 0.25 to 0.95.

2. A pigment according to claim 1, wherein the core is in platelet form and is 1 to 200 μm long, 1 to 200 μm wide and 0.01 to 5 μm thick.

3. A pigment according to claim 1, wherein the core consists of a metallic reflecting material.

4. A pigment according to claim 3, wherein the core consists of Ag, Al, Au, Cu, Cr, Ge, Mo, Ni, Si, Ti, an alloy thereof, graphite, $Fe_2O_3$ or $MoS_2$.

5. A pigment according to claim 3, wherein the core reflects at least 35% of the light falling vertically on its surface in the range from 380 to 800 nm.

6. A pigment according to claim 1, wherein the core material consists of a transparent material.

7. A pigment according to claim 6, wherein the core material consists of mica.

8. A pigment according to claim 1, wherein the average molar ratio of oxygen to silicon is from 0.6 to 0.8.

9. A pigment according to claim 1, wherein coating (b) has a layer thickness of 10 to 500 nm.

10. A pigment according to claim 1, wherein the morphology and the optical properties of coating (b) are obtained at a temperature in the range of 20° C. to 250° C.

11. A pigment according to claim 10, wherein the temperature is from 60° C. to 120° C.

12. A pigment according to claim 1, wherein coating (b) is of substantially amorphous character.

13. A pigment according to claim 1, comprising
   (a) a core consisting of a substantially transparent or metallic reflecting material,
   (b) at least one coating consisting essentially of one or more than one silicon oxide, and
   (c) at least one further coating which is applied on the same side of core (a) as coating (b) and which consists of a substantially transparent material, the composition of which coating is different from that of coating (b),
in any relative arrangement of coatings (b) and (c) in relation to core (a), wherein the average molar ratio of oxygen to silicon of coating (b) is from 0.25 to 0.95.

14. A pigment according to claim 13, wherein the material of coating (c) consists of one or more than one metal oxide or of one or more than one metal fluoride.

15. A pigment according to claim 14, wherein the material of coating (c) consists of one or more than one oxide or mixed oxide of Si, Ti, Zn, Sn, Ge, Zr, Al, Fe, V, Ni, Co, Cu, Cr or Pb, or of one or more than one fluoride of Mg or Ca.

16. A pigment according to claim 15, wherein the material of coating (c) consists of $SiO_2$.

17. A pigment according to claim 13, wherein coating (b) is between core (a) and coating (c), and coating (c) has a layer thickness of 0.1 to 200 nm.

18. A pigment according to claim 13, wherein coating (c) is between core (a) and coating (b) and has a layer thickness of 70 to 500 nm.

19. A pigment according to claim 18, wherein the refractive index of coating (b) is at least 1.7.

20. A pigment according to claim 18, wherein the material of coating (c) consists of one or more than one silicon oxide, the average molar ratio of oxygen to silicon of coating (c) being from 1.0 to 2.0 and the refractive indices of coatings (b) and (c) differing by at least 0.1.

21. A pigment according to claim 20, wherein the average molar ratio of oxygen to silicon of coating (c) is from 1.5 to 2.0 and the refractive indices of coatings (b) and (c) differs by at least 0.2.

22. A pigment according to claim 13, wherein coatings (b) and (c) are in direct contact and wherein the refractive indices of coatings (b) and (c) differ by at least 0.1.

23. A pigment according to claim 22, wherein the refractive indices of coatings (b) and (c) differ by at least 0.2.

24. A pigment according to claim 13, comprising at least two coatings (b) and (b'), consisting essentially of one or more than one silicon oxide, and at least two further coatings (c) and (c'), consisting of a substantially transparent material, wherein (b) and (b'), and (c) and (c'), respectively, have the same composition and layer thickness and are each arranged in mirror symmetry in relation to core (a).

25. A pigment according to claim 24, consisting of a flat core (a) and one each of coatings (b), (b'), (c) and (c').

26. A pigment according to claim 24, consisting of a pigment according to claim 25 and a surface protective layer.

27. A pigment according to claim 1, wherein core (a) as well as all coatings eventually applied thereto have substantially uniform layer thicknesses.

28. A coated transparent or metallic reflecting substrate having a substantially smooth surface and having at least one dimension which is greater than 200 μm, which comprises a layer of one or more than one silicon oxide, wherein the average molar ratio of oxygen to silicon of this silicon oxide layer is from 0.25 to 0.95.

29. A coated substrate according to claim 28, which comprises an additional layer consisting of a substantially transparent material, the composition of which differs from that of the silicon oxide layer having a molar ratio of oxygen to silicon of 0.25 to 0.95.

30. A process for coating a substrate with a coating consisting essentially of one or more than one silicon oxide, the average molar ratio of oxygen to silicon being from 0.25 to 0.95, by vacuum evaporation, sputtering or chemical vapor deposition of metallic silicon in the presence of gaseous oxygen at an oxygen partial pressure of $3.0 \cdot 10^{-4}$ Pa to $1.8 \cdot 10^{-3}$ Pa.

31. A process for coating a substrate with two coatings (b") and (c"), each consisting essentially of one or more than one silicon oxide, by vacuum evaporation, sputtering or chemical vapor deposition of metallic silicon in the presence of gaseous oxygen, wherein the average molar ratio of oxygen to silicon of coating (b") is from 0.25 to 0.95, the average molar ratio of oxygen to silicon of coating (c") is from 1.0 to 2.0, and the oxygen partial pressure is changed in the course of the coating process.

32. A pigmented composition, comprising a high molecular weight organic material and from 0.1 to 30% by weight, based on the high molecular weight organic material, of a pigment according to claim 1.

33. A pigmented composition according to claim 32, wherein there is from 1 to 20% by weight, based on the high molecular weight organic material, of a pigment according to claim 1.

34. A composition according to claim 33, wherein the high molecular weight organic material is a paint or a printing ink.

35. A composition according to claim 34, wherein the high molecular weight organic material is an automotive lacquer.

36. A method for pigmenting high molecular weight organic material, characterized in that a pigment according to claim 1 is added to said high molecular weight organic material.

* * * * *

UNITED STATES PATENT AND TRADEMARK OFFICE
CERTIFICATE OF CORRECTION

PATENT NO. : 5,766,335
DATED : June 16, 1998
INVENTOR(S) : Patrice Bujard, et. al.

It is certified that error appears in the above-identified patent and that said Letters Patent is hereby corrected as shown below:

Title page, left column, insert section

-- [30]   Foreign Application Priority Data

April 25, 1996   [CH]   Switzerland ...................1053/96 --   and

Title page, left column, section [75] should read:

Patrice Bujard, Courtepin; Natacha Bonnard, Chables, both of Switzerland Signed and Sealed this Ninth Day of February, 1999

Attest:

*Acting Commissioner of Patents and Trademarks*

*Attesting Officer*